United States Patent [19]

Sutt, Jr.

[11] Patent Number: 4,627,857

[45] Date of Patent: Dec. 9, 1986

[54] CARBON MOLECULAR SIEVES AND A PROCESS FOR THEIR PREPARATION AND USE

[75] Inventor: Robert F. Sutt, Jr., Johnstown, Pa.

[73] Assignee: Calgon Carbon Corporation, Pittsburgh, Pa.

[21] Appl. No.: 709,467

[22] Filed: Mar. 7, 1985

Related U.S. Application Data

[60] Division of Ser. No. 561,005, Dec. 13, 1983, Pat. No. 4,526,887, which is a continuation-in-part of Ser. No. 475,797, Mar. 16, 1983, abandoned.

[51] Int. Cl.$^4$ .............................................. B01D 53/04
[52] U.S. Cl. ........................................... 55/70; 55/68; 55/73; 55/75
[58] Field of Search ............... 55/68, 74, 75, 387, 55/389, 70-73

[56] References Cited

U.S. PATENT DOCUMENTS

| | | | |
|---|---|---|---|
| 3,801,513 | 4/1974 | Munzner et al. | 55/75 X |
| 4,256,469 | 3/1981 | Leitgeb | 55/68 X |
| 4,264,339 | 4/1981 | Juntgen et al. | 55/68 X |
| 4,376,640 | 3/1983 | Vo | 55/68 X |
| 4,415,340 | 11/1983 | Knoblauch et al. | 55/68 X |
| 4,440,548 | 4/1984 | Hill | 55/68 X |
| 4,440,551 | 4/1984 | Henning et al. | 55/75 X |
| 4,444,572 | 4/1984 | Avon et al. | 55/68 X |
| 4,482,362 | 11/1984 | Yamazaki et al. | 55/68 X |
| 4,494,966 | 1/1985 | Umeki | 55/68 X |
| 4,526,887 | 7/1985 | Sutt, Jr. | 55/68 X |

*Primary Examiner*—Robert Spitzer
*Attorney, Agent, or Firm*—Reed, Smith, Shaw & McClay

[57] ABSTRACT

The present invention relates to a process for separating mixtures of gases or liquids containing at least two different molecular characteristics which comprise passing the liquid or gas through a carbon molecular sieve prepared from a naturally occurring substrate and selected from the group consisting of molecular sieves having:

a. an oxygen diffusivity of $800 \times 10^{-8}$ cm$^2$/sec or less and a diffusivity ratio of oxygen to nitrogen of 15 to 100;

b. an oxygen diffusivity of $600 \times 10^{-8}$ cm$^2$/sec or less and a diffusivity ratio of oxygen to nitrogen greater than 100; and c. an oxygen diffusivity greater than $800 \times 10^{-8}$ cm$^2$/sec and a diffusivity ratio of oxygen to nitrogen greater than 5;

where the diffusivity is measured using a starting gas pressure of one atmosphere (+/−5%) at a temperature of 25° +/−5% for 30 seconds.

20 Claims, 2 Drawing Figures

CARBON MOLECULAR SIEVES AND A PROCESS FOR THEIR PREPARATION AND USE

This is a division of application Ser. No. 561,005, filed Dec. 13, 1983, now U.S. Pat. No. 4,526,887 which is a continuation-in-part application of U.S. Ser. No. 475,797, filed Mar. 16, 1983, now abandoned.

BACKGROUND OF THE INVENTION

Carbon molecular sieves are porous substrates with an open-network structure of controlled molecular dimension used to separate small molecular gases or liquids from larger molecular sized gases or liquids based on differences in capacity or rates of adsorption. See for example, Grant, U.S. Pat. No. 3,884,830 and references cited therein.

Carbon molecular sieves have generally been prepared in an externally fired rotary kiln or other similar non-continuous, batch-type furnace. One such batch-type manufacturing process is described in U.S. Pat. No. 3,979,330. Coke combined with pitch, bitumen, tar or tar oil is heated at from 600° to 900° C. and then subjected to carbon splitting off atmosphere at this temperature for a prolonged period. The carbon splitting atmosphere causes carbon deposits to be formed, adjusting the average pore diameter of the cokes. If the coke combined with pitch, bitumen, tar or tar oil is heated from 600° to 900° C. and the coking products are not separated off with a rinsing or scavenger gas, the gas-formed coking product will exert the same effect as the carbon splitting off hydrocarbon. See also, Great Britain Patent Specification No. 1,181,209.

The major difficulties associated with the batch-type noncontinuous manufacture of carbon molecular sieves are (1) the need for painstaking atmospheric and temperature regulation for the control of the pore diameter; (2) the product variability from batch to batch, i.e., quality control; and (3) relatively long residence time. See Munzner et al. U.S. Pat. No. 3,962,129.

The use of a continuous transport type heating means and a cocurrent inert purge gas, as described herein, eliminates the difficulties of atmosphere and temperature control and relatively long residence times associated with prior art batch-type processing.

SUMMARY OF THE INVENTION

Figure 1:
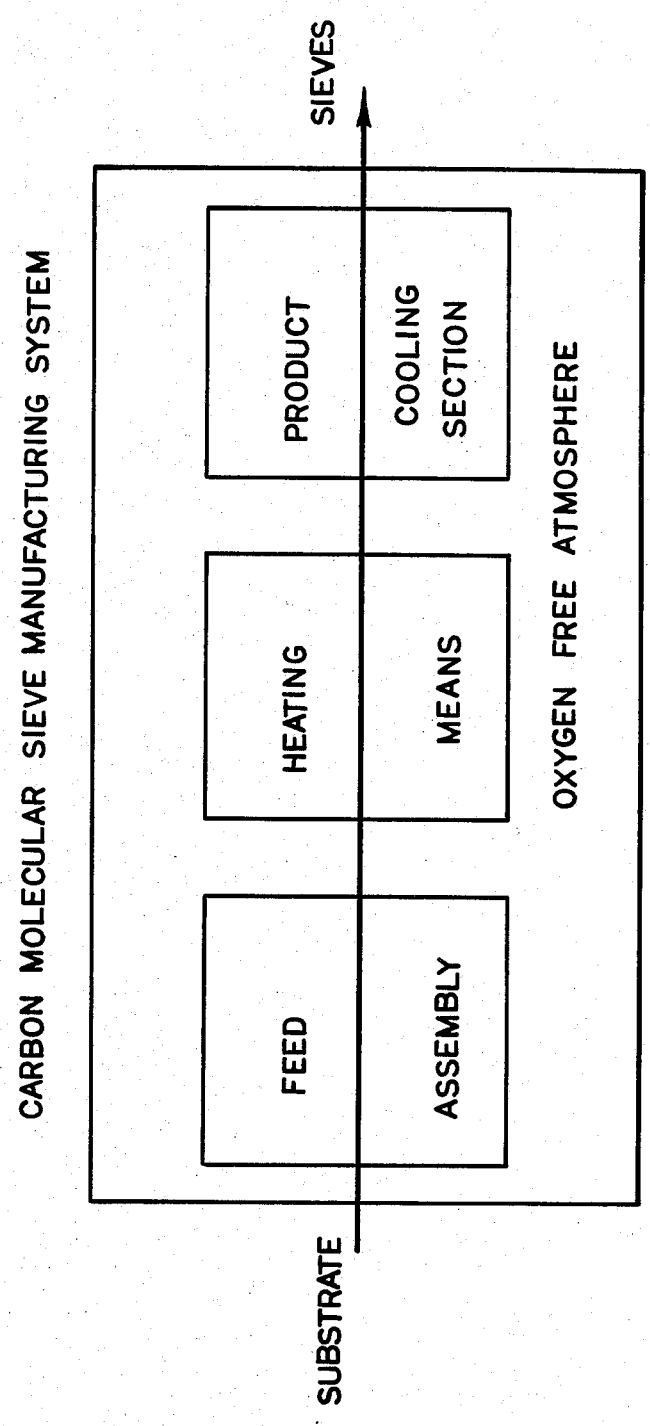
FIG. 1 is a schematic diagram which may be used for the continuous manufacture of carbon molecular sieves.

The instant invention is directed to a carbon molecular sieve which is capable of separating gas or liquid mixtures containing components of at least two different molecular diameters, molecular weights or molecular shapes, said molecular sieve having an average effective pore diameter of from about 3 to about 20 Angstroms, preferably 4 to 10 Angstroms, and having:

(a)
  (i) an oxygen diffusivity of $800 \times 10^{-8}$ cm$^2$/sec or less, preferably $500 \times 10^{-8}$ to $750 \times 10^{-8}$ cm$^2$/sec, and
  (ii) a diffusivity ratio of oxygen to nitrogen of 15 to 100, preferably 15 to 75; or (b)
  (i) an oxygen diffusivity of $600 \times 10^{-8}$ cm$^2$/sec or less, preferably $50 \times 10^{-8}$ to $500 \times 10^{-8}$ cm$^2$/sec, and
  (ii) a diffusivity ratio of oxygen to nitrogen greater than 100, preferably 100 to 4000, most preferably 175 to 1550; or (c)
  (i) an oxygen diffusivity of greater than $800 \times 10^{-8}$ cm$^2$/sec, preferably $800 \times 10^{-8}$ to $3000 \times 10^{-8}$ cm$^2$/sec, most preferably $900 \times 10^{-8}$ to $2100 \times 10^{-8}$ cm$^2$/sec, and
  (ii) a diffusivity ratio of oxygen to nitrogen greater than 5, preferably 9 to 400, most preferably 9 to 25; and also (preferably) having:
  (iii) optionally, a carbon dioxide diffusivity greater than $200 \times 10^{-8}$ cm$^2$/sec, more preferably greater than $400 \times 10^{-8}$ cm$^2$/sec; and
  (iv) optionally, a methane diffusivity greater than $0.01 \times 10^{-8}$ cm$^2$/sec, more preferably greater than $0.1 \times 10^{-8}$ cm$^2$/sec.

The instant invention is also directed to a process for preparing carbon molecular sieves having average effective pore diameters of from about 3 to about 20 Angstroms, preferably 4 to 10 Angstroms, which comprises continuously feeding an agglomerated naturally occurring substrate to a continuous transport type heating means and calcining said agglomerated substrate in a substantially non-activation environment under a purge of an inert gas at a temperature range of about 250° to 1100° C. for at least 1 minute.

The instant invention is also directed to a process for separating gas or liquid mixtures containing components of at least two different molecular diameters, molecular weights or molecular shapes, comprising passing the liquid or gas through a molecular sieve having an average effective pore diameter of from about 3 to about 20 Angstroms, preferably 4 to 10 Angstroms, and having:

(a)
  (i) an oxygen diffusivity of $800 \times 10^{-8}$ cm$^2$/sec or less, preferably $500 \times 10^{-8}$ to $750 \times 10^{-8}$ cm$^2$/sec, and
  (ii) a diffusivity ratio of oxygen to nitrogen of 15 to 100, preferably 15 to 75; or (b)
  (i) an oxygen diffusivity of $600 \times 10^{-8}$ cm$^2$/sec or less, preferably $50 \times 10^{-8}$ to $500 \times 10^{-8}$ cm$^2$/sec, and
  (ii) a diffusivity ratio of oxygen to nitrogen greater than 100, preferably 100 to 4000, most preferably 175 to 1550; or (c)
  (i) an oxygen diffusivity of greater than $800 \times 10^{-8}$ cm$^2$/sec, preferably $800 \times 10^{-8}$ to $3000 \times 10^{-8}$ cm$^2$/sec, most preferably $900 \times 10^{-8}$ to $2100 \times 10^{-8}$ cm$^2$/sec, and
  (ii) a diffusivity ratio of oxygen to nitrogen greater than 5, preferably 9 to 400, most preferably 9 to 25; and also (preferably) having:
  (iii) optionally, a carbon dioxide diffusivity greater than $200 \times 10^{-8}$ cm$^2$/sec, more preferably greater than $400 \times 10^{-8}$ cm$^2$/sec; and
  (iv) optionally, a methane diffusivity greater than $0.01 \times 10^{-8}$ cm$^2$/sec, more preferably greater than $0.1 \times 10^{-8}$ cm$^2$/sec.

The diffusivities are determined by observing the adsorption of a test gas into a previously evacuated carbon molecular sieve, at a pressure of substantially one atmosphere and a temperature of substantially 25° C., then calculating the diffusivity value using a simple equation which describes diffusion into a sphere:

$$L_t/L_e = 6(Dt/\pi R_0^2)^{\frac{1}{2}} - 3Dt/R_0^2$$

where
$L_t$ = test gas loading at time, t = 30 seconds
$L_e$ = equilibrium loading (usually at t = 1 hour
D = diffusivity value
t = 30 seconds
$R_0$ = 0.05125 cm (the mean particle radius of a reference adsorbent)

DETAILED DESCRIPTION

The present invention is directed to carbon molecular sieves having average effective pore diameters of from about 3 to about 20 Angstroms, preferably from about 4 to 10 Angstroms, a process for their manufacture, and their use in separating gas or liquid mixtures. These sieves are prepared from an agglomerated naturally occurring substrate by cocurrent calcination in a continuous transport type heating means which controls the factors of temperature, residence time and atmosphere.

The phrase "carbon molecular sieves", as used herein, refers to a porous substrate with an open-network structure of controlled molecular dimension used to separate small (i.e. in diameter, weight or shape) molecular gases or liquids from larger or different molecular sized gases or liquids based on differences in capacity or rates of adsorption.

The term "calcining", as used herein, refers to the thermal treatment of an agglomerated substrate substantially in the absence of oxygen or other oxidizing agents.

The phrase "non-activation conditions" as used herein, means oxygen-free, moisture-free and oxidation-free. Steam, carbon dioxide, carbon monoxide, oxidizing agents and the like, cause activation at temperatures in excess of 500° C. ($O_2$ greater than 500° C., $H_2O$ greater than 750° C., CO or $CO_2$ greater than 1000° C.). The use of an inert gas purge is one way to prevent activation, by sweeping away the oxygen. The faster the purge, the greater the chance of preventing activation. A countercurrent purge generally is better than a cocurrent purge in preventing activation, although either will work.

The phrase "substantially oxygen-free environment", as used herein, refers to a furnace oxygen atmosphere of less than 10,000 ppm, preferably less than 5,000 ppm, most preferably less than 1,000 ppm by volume oxygen. This oxygen-free atmosphere is maintained both prior to and during the manufacture of the carbon molecular sieves by a cocurrent (i.e., flowing in the same direction as the substrate) purge of an inert gas, such as nitrogen. Helium, argon and other oxygen free inert gases would also suffice. This inert purge gas serves to sweep volatile gases away from the heated substrate and, thus, regulate the level of volatiles present during calcination, preventing any significant activation.

The phrase "agglomerated naturally occurring substrate" refers to non-cokable or decoked carbonaceous materials combined with a thermal binder, such as coal tar pitch, petroleum pitch, asphalt, bitumin and lignin, and optionally a cold binder, such as starch, and optionally water. Typical non-cokable materials include coconut char, babassu nut char, anthracite coals, high ranking bituminous coals and other non-cokable materials recognized in the art. Decoked materials include oxidized (decoked) medium volatile bituminous coals, oxidized lignite and other decoked materials recognized in the art. Preferred carbonaceous materials are coconut char and decoked coal. The substrate should not be activated prior to use in the process of the invention or during use in producing the molecular sieve.

Agglomerated substrate is prepared from a non-coking or decoked carbonaceous material, a thermal binder, and optionally, a cold binding agent, such as starch and optionally, water. The carbonaceous material may comprise from 30 to 98 percent by weight of the agglomerated substrate. The thermal binder may comprise from 1 to 40 percent, the cold binding agent may comprise from 0 to 20 percent, and water may comprise 0 to 40 percent. Alternatively, the agglomerated substrate may be prepared from a mixture of from 30 to 98 percent carbonaceous material and tar pitch or asphalt binder heated to the softening point of the binder. Useful agglomeration techniques are described in U.S. Pat. No. 3,844,830.

Following agglomeration, the substrate may be sized and screened. Alternatively, a mixture may be pelletized, put in other forms or otherwise extended. The sized agglomerated substrate may be fed to the furnace in a moist form or in a dried form. Drying is accomplished at from 30° to 200° C. for preferably, 0.5 to 180 minutes. The agglomerated substrate should not be heated above 200° C., as this will form a "baked product", changing the chemical composition of the thermal binder. The thermal binder needs to be in the "raw" form (i.e. chemically unchanged) for use in the present invention. Baked agglomerate may be used if raw thermal binder is added to ground baked agglomerate before use in the process of the instant invention.

"Baked product" is an agglomerated product which has been heated, preferably stepwise, up to 150° to 500° C. in the presence of oxygen to devolatize the thermal binder and form a crusty binder.

Carbon molecular sieve average effective pore diameters are generally governed by the following factors:
(A) furnace temperature
(B) furnace atmosphere
(C) residence time
(D) presence or absence of a pore blocking substance In the present invention, sieve quality control has been achieved by modifying the heating time, temperature, and atmosphere processing conditions. A preferred heating means for carrying out this invention is described in U.S. Pat. Nos. 4,050,900 and 3,648,630 which are herein incorporated by reference. Other heating means that may prove useful in the instant process include indirectly fired rotary kilns, the Selas type indirectly fired or electrically fired screw conveyor kiln or some of the various types of metal treating furnaces (e.g., Lindberg) known in the art.

A preferred system consists of a feed assembly, the heating means, and a dry product cooling section (see FIG. 1). Air locks are located between the feed assembly and the heating means and on the discharge end of the product cooling section. A preferred heating means is an electrically fired furnace having two independently controlled hot zones. Each hot zone contains silicon carbide infra-red glow bars controlled by centrally located chromel-alumel thermocouples.

In one embodiment of the instant process the furnace was brought to the desired temperature under a cocurrent inert gas (e.g., nitrogen) purge. Belt speed was set to adjust furnace residence time. The furnace generally reached a steady state in 6 to 8 hours and then feed was begun. Agglomerated substrate was fed to the system under a cocurrent flow of the inert gas thereby producing carbon molecular sieves. The cocurrent purge may act to control or regulate the level of volatiles present in the agglomerated substrate. Completion of a furnace run was accomplished by turning the feed system off and clearing the furnace. Process conditions were as follows:

|  | Range | Preferred |
|---|---|---|
| (A) residence time | at least 1 min | 1 to 180 min (most preferably 10 to 60 min) |
| (B) temperature | 250° to 1100° C. | 500° to 1000° C. |
| (C) nitrogen purge | 1.2 to 9.2 ft/min | 1.2 to 4.6 ft/min |
| (D) feed rate | 1 to 90 lb/hr | 40 to 55 lb/hr |

The nitrogen purge (linear velocity) and feed rate depend on the furnace used and may fall outside the above ranges.

If the furnace temperature was adjusted, about one to two hours was generally required for the furnace to equilibrate. Furnace temperature and residence time were found to be inversely related. Long residence times coupled with low temperatures produced sieves similar to those manufactured at high temperatures with shorter residence times.

To optimize the effectiveness of a molecular sieve, the product should have (1) a high selectivity ratio and (2) a high capacity value.

The terms diffusivity, selectivity and capacity refer to characteristics of a molecular sieve. Gas (or liquid) diffusivity refers to the speed with which a gas (or liquid) passes into or out of the pores of a particular molecular sieve. Selectivity is defined as the ratio of two gas diffusivity values. A high selectivity ratio indicates that the sieve readily discriminates between gas mixture components. A high capacity value indicates that a small amount of molecular sieve will adsorb a large volume of gas (or liquid).

The novel carbon molecular sieves of the present invention have balanced capacity, selectivity and diffusivity characteristics. The broad range of sieve materials with unusual selectivity and capacity is believed achievable because of the mechanism involved in their formation using the herein disclosed process. The effectiveness of this process in preparing a wide range of new carbon molecular sieves is believed to be due to the selection plugging or total blocking of the macropore structure of the carbonaceous materials used in preparing the agglomerated substrate. By plugging these large pores by char formed from globules of organic materials trapped in the large pores during the manufacturing process, gas molecules can diffuse into the resulting sieve only through the interconnecting fine porosity in the carbonaceous materials used in preparing the agglomerated substrate.

The various carbon molecular sieves will have varying capacities and selectivity ratios. Gases such as hydrogen, helium, carbon monoxide, carbon dioxide, methane, and the like may be separated from their mixtures with air or other gases by employing the novel carbon molecular sieves of this invention.

In general, it has been found that smaller, lighter molecules are adsorbed more rapidly by carbon molecular sieves than larger, heavier molecules. A typical listing of molecules in order of decreasing diffusivity into carbon molecular sieves is as follows: hydrogen, helium, oxygen, carbon monoxide, carbon dioxide, ammonia, nitrogen, argon, methane, hydrogen sulfide, ethylene, ethane, propylene, ethanol, propane, n-butane, isobutane, n-pentane, isopentane, o-xylene, m-xylene, p-xylene, n-hexane, 2-methyl pentane, n-heptane. This listing is not complete, but is meant merely as a rule of thumb. Some variation in the order of diffusivities should be expected, depending upon the specific adsorbent used. However, the adsorption rate differences due to molecular diameter, molecular shape, molecular velocity and/or adsorbate/adsorbent interactions serves as a basis for separating gaseous or liquid mixtures. The greater the difference in adsorption rate of the mixture components, the easier it is to separate the mixture. The terms "molecular diameter", "molecular shape", "molecular velocity" and "adsorbate/adsorbent intereactions" are well understood by those familiar with transport phenomena and adsorption theory. Nevertheless, the following works are hereby included for reference:

(1) R. B. Bird, W. E. Stewart and E. N. Lightfoot, *Transport Phenomena*, J. Wiley & Sons, New York (1960).

(2) J. O. Hirshfelder, C. F. Crentis and R. B. Bird, *Molecular Theory of Gases and Liquids*, J. Wiley & Sons, New York (1954).

(3) W. A. Steele, "The Interaction of Gases with Solid Surfaces", *The International Encyclopedia of Physical Chemistry and Chemical Physics*, Topic 14, Volume 3, Pergamon Press, Oxford (1974).

(4) A. W. Anderson, *Physical Chemistry of Surfaces*, John Wiley & Sons, New York (1976).

The "average effective pore diameter" can be inferred from the diffusivity or capacity of the sieve for gases of known molecular size.

It is recognized that the absolute diffusivity of gases or liquids into solid adsorbents is difficult to ascertain experimentally. This is especially true of carbonaceous adsorbents which are structurally non-homogenous. For purposes of comparison, however, it is possible to select a reference adsorbent of a known size against which other adsorbents are relatively judged. Diffusivity values thus obtained will be useful in describing the adsorption of gases or liquids into a range of adsorbents. The carbon molecular sieves described herein were tested by observing the adsorption of various gases into previously evacuated samples at substantially one atmosphere pressure and substantially 25° C. Diffusivity values were then calculated using a simple equation which describes diffusion into a sphere:

$$L_t/L_e = 6(Dt/\pi R_0^2)^{\frac{1}{2}} - 3Dt/R_0^2$$

where
$L_t$ = test gas loading at time, t = 30 seconds
$L_e$ = equilibrium loading (usually at t = 1 hour)
D = diffusivity value
t = 30 seconds
$R_0$ = 0.05125 cm (the mean particle radius of a reference adsorbent)

It is understood that the choice of alternate parameters (e.g. another reference radius, temperature, pressure or time, t) would alter the absolute and relative magnitude of the diffusivity values thus obtained. This should not, however, be construed as limiting the breadth or validity of the invention described herein.

Figure 2:
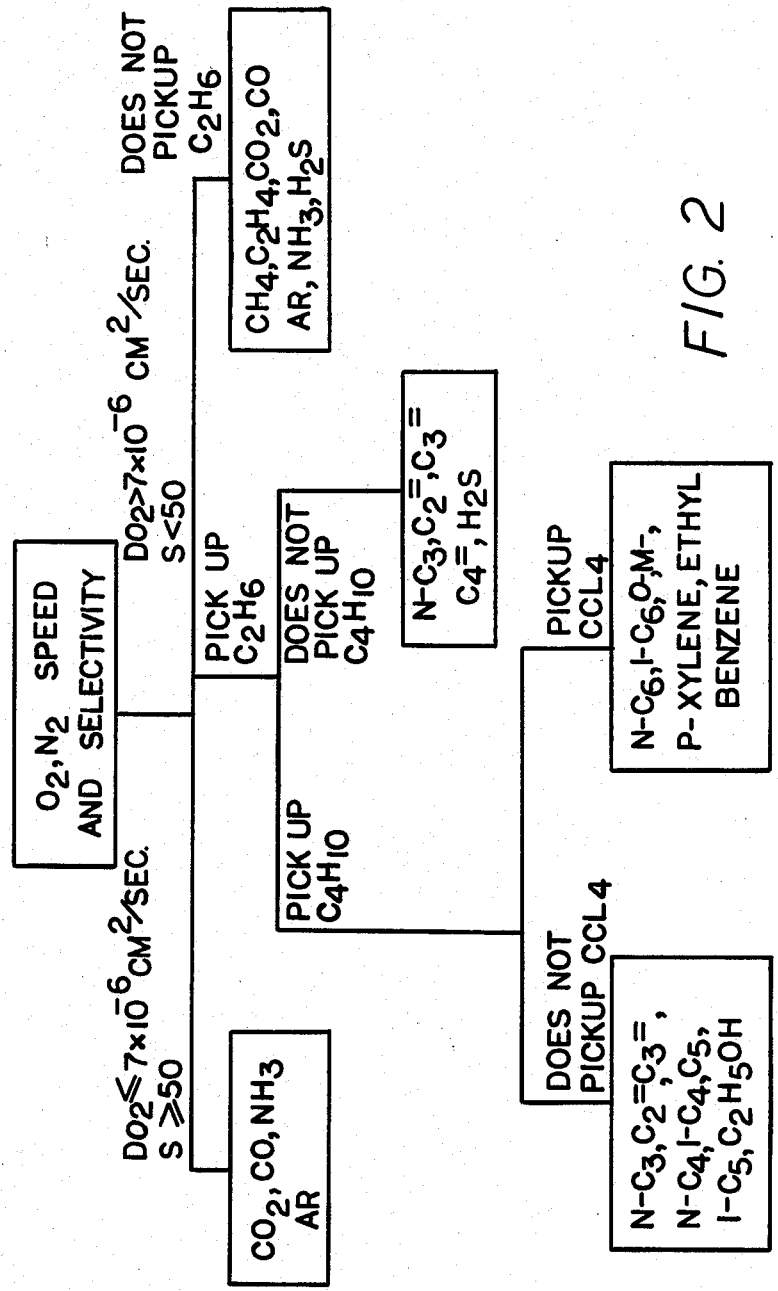
FIG. 2 is a flow chart indicating the separation characteristics of small and medium sized gases, based upon molecular sieve oxygen and nitrogen diffusivities (speed) and oxygen/nitrogen selectivity ratios and the adsorption of various model compounds.

FIG. 2 represents a flow chart for selecting molecular sieves for specific gas separations. In this flow chart, the sieve sample is first analyzed for oxygen and nitrogen diffusivities (speed) as described herein above. From these two values, the oxygen/nitrogen selectivity ratio is calculated.

For light gases, e.g., oxygen, nitrogen, carbon monoxide, carbon dioxide and the like, both the diffusivity (speed) values and the selectivity ratio should be high. The generally useful values for light gases are diffusivities of at least $10 \times 10^{-8}$ cm$^2$/sec for at least one of the gases, preferably at least $200 \times 10^{-8}$ cm$^2$/sec, most preferably at least $500 \times 10^{-8}$ cm$^2$/sec, combined with selectivity ratios of at least 1.1, preferably at least 10, more preferably at least 25, most preferably at least 50.

For heavy gases, e.g., ethanes, propanes, butanes and the like, diffusivity values should be at least $0.1 \times 10^{-8}$ cm$^2$/sec for at least one of the gases, preferably at least $25 \times 10^{-8}$ cm$^2$/sec, most preferably at least $100 \times 10^{-8}$ cm$^2$/sec, and selectivity ratios should be on the order of at least 1.1, preferably at least 5, most preferably at least 20, most preferably at least 50.

The diffusivity of liquids can be lower than the minimums for gases.

Once the oxygen/nitrogen selectivity ratio has been calculated, and the oxygen speed ascertained, the flow chart is useful in deciding which particular gas separation will be most effective for the particular sieve in question.

Following the left arm of FIG. 2, if oxygen speed is less than or equal to $7 \times 10^{-6}$ cm$^2$/sec with an oxygen/nitrogen selectivity ratio of greater than or equal to 50, the sieve may be useful for separating carbon monoxide, carbon dioxide, ammonia or argon.

Following the right arm of FIG. 2, if the oxygen speed is greater than $7 \times 10^{-6}$ cm$^2$/sec, but the oxygen/nitrogen selectivity ratio is less than 50, additional tests are required. If the sieve in question does not adsorb ethane, then it may be useful in separating methane, ethylene, carbon monoxide, carbon dioxide, argon, ammonia or hydrogen sulfide. If the sample does adsorb ethane, additional tests are required to find the most efficient gas mixture situation for which the sieve may be employed.

It should be noted, that the flow chart of FIG. 2 is only a suggested guideline. The molecular sieves of the present invention are all useful for a variety of gas separations. The object of FIG. 2 is only to determine preferred separation schemes.

Although carbon molecular sieves with a wide variety of gas diffusivities may be manufactured by the instant process, several novel sieves have been produced by the instant process having the following gas diffusivities and selectivity ratios:

(a)
  (i) an oxygen diffusivity of less than or equal to $800 \times 10^{-8}$, preferably $500 \times 10^{-8}$ to $750 \times 10^{-8}$ cm$^2$/sec and
  (ii) a diffusivity ratio of oxygen to nitrogen of 15 to 100, preferably 15 to 75; or (b)
  (i) an oxygen diffusivity of less than or equal to $600 \times 10^{-8}$, preferably $50 \times 10^{-8}$ to $500 \times 10^{-8}$ cm$^2$/sec and
  (ii) a diffusivity ratio of oxygen to nitrogen greater than 100, preferably 100 to 4000, most preferably 175 to 1550; or (c)
  (i) an oxygen diffusivity of greater than $800 \times 10^{-8}$, preferably $800 \times 10^{-8}$ to $3000 \times 10^{-8}$, most preferably $900 \times 10^{-8}$ to $2100 \times 10^{-8}$ cm$^2$/sec and
  (ii) a diffusivity ratio of oxygen to nitrogen greater than 5, preferably 9 to 400, most preferably 9 to 25 and
  (iii) optionally a carbon dioxide diffusivity greater than $200 \times 10^{-8}$, preferably greater than $400 \times 10^{-8}$, most preferably greater than $600 \times 10^{-8}$ cm$^2$/sec and
  (iv) optionally a methane diffusivity of greater than $0.01 \times 10^{-8}$, preferably greater than $0.1 \times 10^{-8}$ cm$^2$/sec.

Although the specification has been directed primarily to gas separations, the molecular sieves are equally effective in separating liquids.

For comparison, a carbon molecular sieve, commercially available from Bergbau Forshung of Essen, West Germany, useful for the separation of nitrogen from air was tested for its diffusivity and capacity for various gases. The results were as follows:

| Gas | Diffusivity (cm$^2$/sec) | Capacity (cc/cc) |
|---|---|---|
| Oxygen | $670 \times 10^{-8}$ | 3.50 |
| Carbon Dioxide | $110 \times 10^{-8}$ | 19.6 |
| Methane | nil | nil |
| Nitrogen | $2.63 \times 10^{-8}$ | — |

Carbon molecular sieves have been prepared from nonagglomerated substrates such as coconut char, as described in the first example.

EXAMPLE 1 (Comparison)

Coconut char (3×6 mesh) was heated in a continuous transport type furnace, in the absence of oxygen, at 843° C. for 10 minutes under a cocurrent nitrogen purge of 5.8 feet/minute.

A continuous transport furnace manufactured by Shirco, Inc. was used in each of the examples. Upon cooling under nitrogen, the carbon molecular sieves were analyzed for gas diffusivity as described below.

To calculate a test gas (e.g., oxygen, nitrogen, etc.) diffusivity value, the dead volume of a sample cell containing about 10 grams of carbon sieve was determined by helium expansion. The test gas was then expanded into the reevacuated sample cell from a one liter reference cell. Knowing the dead volume, adsorption (loading) of the test gas was monitored by the change in pressure of the system. These values combined with an equilibrium loading value calculated for a sieve sample after one hour at room temperature and atmospheric pressure, allowed the determination of a relative loading value ($L_t/L_e$). $L_t$ was the test gas loading value of a sieve sample at a given time, for example 30 seconds, and $L_e$ was the test gas loading value of a sieve sample at equilibrium. The gas diffusivity value (D) of a sieve sample was then calculated for the test gas by solving the simplified equation for diffusion into a sphere:

$$L_t/L_e = 6(Dt/\pi R_0^2)^{\frac{1}{2}} - 3Dt/R_0^2$$

where
$L_t$ = test gas loading at time, t = 30 seconds
$L_e$ = equilibrium loading (usually at t = 1 hour
D = diffusivity value
t = 30 seconds
$R_0$ = 0.05125 cm (the mean particle radius of a reference adsorbent)

See: Dedrick, R. L. and Beckmann, R. B., "Kinetics of Adsorbtion by Activated Carbon from Dilute Aqueous Solution", *Physical Adsorption Processes and Principles*, L. N. Canjar and J. A. Kostecki, eds., Vol. 63, American Institute of Chemical Engineers, New York (1967); Walker, P. L., Jr., Austin, L. G., Nandi, S. P., "Activated Diffusion of Gases in Molecular Sieve Materials", *The Chemistry and Physics of Carbon*, P. L. Walker, Jr., ed., Vol. 2, Marcel Dekker, Inc., New York (1966) and Crank, J., "The Mathematics of Diffusion", 2nd Ed., Clarendon Press, Oxford (1975).

Diffusivity values for this and all subsequent examples were determined using a starting gas pressure of one atmosphere ±5 percent at a temperature of 25° C.±5° C. The time, t, used in these determinations was 30 seconds. Determination of test gas diffusivity values allowed for calculation of the selectivity ratio (e.g. oxygen/nitrogen S = $DO_2/DN_2$). The capacity of the sieve was determined by expressing the equilibrium loading, $L_e$, as a gas volume (STP) per cubic centimeter of adsorbent.

Carbon sieves having an oxygen diffusivity value of $1930 \times 10^{-8}$ cm$^2$/sec and an oxygen/nitrogen selectivity of 1.30 were prepared. The apparent density was 0.505 g/cc and the oxygen capacity was 3.55 cc/cc.

Examples 2-10 describe the production of carbon molecular sieves from agglomerated carbonaceous materials by cocurrent calcination. These examples are merely illustrative of the present invention. They are not to be construed as limiting the scope of the invention in any manner.

EXAMPLE 2

80 parts by weight pulverized sieve from Example 1, 20 parts by weight pulverized coal tar pitch (ring & ball melting point = 105° C.), 2 parts by weight starch and 20 percent water were mixed in a ribbon blender until uniformly damp. The damp mixture was formed into ⅛-inch pellets using a pellet mill.

The damp pellets were fed to the furnace at 35 pounds per hour. The furnace temperature was 800° C. and the hot zone residence time was 30 minutes. Nitrogen purge was cocurrent at a linear velocity of 3.5 feet/minute.

The diffusivity and capacity for various gases were tested for this carbon molecular sieve and were as follows:

| Gas | Diffusivity (cm$^2$/sec) | Capacity (cc/cc) |
| --- | --- | --- |
| Nitrogen | $0.19 \times 10^{-8}$ | — |
| Oxygen | $78 \times 10^{-8}$ | 4.44 |
| Carbon Dioxide | $55 \times 10^{-8}$ | 15.9 |

The carbon molecular sieve produced had an apparent density of 0.551 g/cc. The selectivity of the sieve was determined for an oxygen/nitrogen gas mixture to be as follows:

| Mixture | | Selectivity ($D_A/D_B$) |
| --- | --- | --- |
| Component A | Component B | |
| Oxygen | Nitrogen | 411 |
| Oxygen | Carbon Dioxide | 1.4 |

EXAMPLE 3

76 parts pulverized coconut char, 22 parts coal tar pitch (melting point = 105° C.), 2 parts starch, and an additional 20 percent water were mixed until uniformly damp. This mixture was formed into ⅛-inch diameter pellets using a pellet mill.

The pellets were fed to the furnace at 50 pounds per hour. Furnace temperature in zone A was 760° C. Furnace temperature in zone B was 838° C. Total hot zone residence time was 10 minutes under a cocurrent nitrogen purge at 1.2 feet/minute.

The sieve was tested for its diffusivity and capacity for various gases. The results were as follows:

| Gas | Diffusivity (cm$^2$/sec) | Capacity (cc/cc) |
| --- | --- | --- |
| Ammonia | $355 \times 10^{-8}$ | 31.3 |
| Argon | $3.9 \times 10^{-8}$ | 3.1 |
| Carbon Dioxide | $266 \times 10^{-8}$ | 21.2 |
| Methane | $1.8 \times 10^{-8}$ | 2.6 |
| Nitrogen | $2.5 \times 10^{-8}$ | — |
| Oxygen | $500 \times 10^{-8}$ | 3.24 |

The selectivity of the sieve was determined for various gas mixtures to be as follows:

| Mixture | | Selectivity ($D_A/D_B$) |
| --- | --- | --- |
| Component A | Component B | |
| Oxygen | Argon | 128 |
| Carbon Dioxide | Methane | 148 |
| Ammonia | Nitrogen | 142 |
| Ammonia | Methane | 197 |
| Oxygen | Nitrogen | 200 |

EXAMPLE 4

Pellets prepared as in Example 3 were fed to the furnace at 50 pounds per hour. Furnace temperature in zone A was 600° C. Furnace temperature in zone B was 827° C. Total hot zone residence time was 10 minutes under a cocurrent nitrogen purge at 1.2 feet/minute.

The sieve was tested for its diffusivity and capacity for various gases. The results were as follows:

| Gas | Diffusivity (cm$^2$/sec) | Capacity (cc/cc) |
| --- | --- | --- |
| Nitrogen | $140 \times 10^{-8}$ | — |
| Oxygen | $1686 \times 10^{-8}$ | 3.27 |
| Carbon Dioxide | $610 \times 10^{-8}$ | 19.3 |
| Ethane | $0.13 \times 10^{-8}$ | 4.4 |

The selectivity of the sieve was determined for an oxygen/nitrogen gas mixture to be as follows:

| Mixture | | |
|---|---|---|
| Component A | Component B | Selectivity ($D_A/D_B$) |
| Oxygen | Nitrogen | 12.0 |
| Carbon Dioxide | Ethane | 4692 |

EXAMPLE 5

Pellets prepared as in Example 3 were fed to the furnace at 50 pounds per hour. Furnace temperature in zone A was 738° C. Furnace temperature in zone B was 827° C. Total hot zone residence time was 10 minutes under a cocurrent nitrogen purge at 1.2 feet/minute.

The sieve was tested for its diffusivity and capacity for various gases. The results were as follows:

| Gas | Diffusivity ($cm^2/sec$) | Capacity (cc/cc) |
|---|---|---|
| Ammonia | $333 \times 10^{-8}$ | 34.8 |
| Argon | $18 \times 10^{-8}$ | 2.33 |
| Carbon Dioxide | $483 \times 10^{-8}$ | 18.7 |
| Ethylene | $0.36 \times 10^{-8}$ | 18.2 |
| Methane | $0.11 \times 10^{-8}$ | 5.76 |
| Nitrogen | $52 \times 10^{-8}$ | — |
| Oxygen | $1242 \times 10^{-8}$ | 3.36 |

The sieve had an apparent density of 0.582. The selectivity of the sieve was determined for various gas mixtures to be as follows:

| Mixture | | |
|---|---|---|
| Component A | Component B | Selectivity ($D_A/D_B$) |
| Carbon Dioxide | Methane | 4390 |
| Ammonia | Argon | 18.5 |
| Oxygen | Argon | 64.9 |
| Nitrogen | Methane | 418.2 |
| Oxygen | Nitrogen | 23.9 |

EXAMPLE 6

Pellets prepared as in Example 3 were fed to the furnace at 52 pounds per hour. The furnace temperature was 800° C. and the hot zone residence time was 30 minutes. Nitrogen flow was cocurrent at 3.5 feet/minute.

The sieve was tested for its diffusivity and capacity for various gases. The results were as follows:

| Gas | Diffusivity ($cm^2/sec$) | Capacity (cc/cc) |
|---|---|---|
| Nitrogen | $31 \times 10^{-8}$ | — |
| Oxygen | $564 \times 10^{-8}$ | 3.52 |

The sieve had an apparent density of 0.579 g/cc. The selectivity of the sieve was determined for an oxygen/nitrogen gas mixture to be as follows:

| Mixture | | |
|---|---|---|
| Component A | Component B | Selectivity ($D_A/D_B$) |
| Oxygen | Nitrogen | 18 |

The apparent density was 0.579 g/cc.

EXAMPLE 7

80 parts by weight pulverized coconut char, 10 parts by weight pulverized coal tar pitch (ring and ball melting point=105° C.), and 10 parts by weight starch were mixed in a ribbon blender until the mixture was uniform. This mixture was then formed into ⅛-inch diameter pellets using a pellet mill.

The pellets were fed to the furnace at 90 pounds per hour. The furnace temperature was 838° C. and the hot zone residence time was 15 minutes. Nitrogen flow was cocurrent at 3.5 feet/minute.

The sieve was tested for its diffusivity and capacity for various gases. The results were as follows:

| Gas | Diffusivity ($cm^2/sec$) | Capacity (cc/cc) |
|---|---|---|
| Nitrogen | $234 \times 10^{-8}$ | — |
| Oxygen | $850 \times 10^{-8}$ | 3.75 |

The sieve had an apparent density of 0.560 g/cc. The selectivity of the sieve was determined for an oxygen/nitrogen gas mixture to be as follows:

| Mixture | | |
|---|---|---|
| Component A | Component B | Selectivity ($D_A/D_B$) |
| Oxygen | Nitrogen | 3.63 |

EXAMPLE 8

Coconut pellets prepared as in Example 7 were fed to the furnace at 51 pounds per hour. The furnace temperature was 838° C. and the hot zone residence time was 30 minutes. Nitrogen flow was cocurrent at 3.5 feet/minute.

The sieve was tested for its diffusivity and capacity for various gases. The results were as follows:

| Gas | Diffusivity ($cm^2/sec$) | Capacity (cc/cc) |
|---|---|---|
| Nitrogen | $89 \times 10^{-8}$ | — |
| Oxygen | $463 \times 10^{-8}$ | 3.93 |

The sieve had an apparent density of 0.561 g/cc. The selectivity of the sieve was determined for an oxygen/nitrogen gas mixture to be as follows:

| Mixture | | |
|---|---|---|
| Component A | Component B | Selectivity ($D_A/D_B$) |
| Oxygen | Nitrogen | 5.21 |

EXAMPLE 9

66 parts by weight pulverized coconut char, 22 parts by weight pulverized coal tar pitch (ring & ball melting point=105° C.), 11 parts by weight starch and 11 percent water were mixed in a ribbon blender until the mixture was uniformly damp. The damp mixture was then formed into ⅛ inch diameter pellets using a pellet mill.

The damp pellets were fed to the furnace at 50 pounds per hour. The furnace temperature was 800° C. and the hot zone residence time was 10 minutes. Nitrogen flow was cocurrent at 3.2 feet/minute.

The sieve was tested for its diffusivity and capacity for various gases. The results were as follows:

| Gas | Diffusivity (cm²/sec) | Capacity (cc/cc) |
|---|---|---|
| Nitrogen | $0.018 \times 10^{-8}$ | — |
| Oxygen | $55.8 \times 10^{-8}$ | 2.60 |

The sieve had an apparent density of 0.43 g/cc. The selectivity of the sieve was determined for an oxygen/nitrogen gas mixture to be as follows:

| Mixture | | Selectivity $D_A/D_B$ |
|---|---|---|
| Component A | Component B | |
| Oxygen | Nitrogen | 3100 |

EXAMPLE 10

Pellets prepared as in Example 3 were fed to the furnace at 50 pounds per hour. Furnace temperature was 820° C. both in hot zone A and B. Total hot zone residence time was 10 minutes under a cocurrent nitrogen purge at 3.5 feet/minute.

The sieve was tested for its diffusivity and capacity for various gases. The results were as follows:

| Gas | Diffusivity (cm²/sec) | Capacity (cc/cc) |
|---|---|---|
| Nitrogen | $0.010 \times 10^{-8}$ | — |
| Oxygen | $150 \times 10^{-8}$ | 3.22 |

The sieve had an apparent density of 0.578 g/cc. The selectivity of the sieve was determined for an oxygen/nitrogen gas mixture to be as follows:

| Mixture | | Selectivity $(D_A/D_B)$ |
|---|---|---|
| Component A | Component B | |
| Oxygen | Nitrogen | 1500 |

EXAMPLE 11

Pellets prepared as in Example 3 were fed to the furnace at 50 pounds per hour. Furnace temperature in both zones A and B was 771° C. Total hot zone residence time was 10 minutes under a cocurrent nitrogen purge at 1.2 feet/minute.

The sieve had an apparent density of 0.566.

The sieve was tested for its diffusivity and capacity for various gases. The results were as follows:

| Gas | Diffusivity (cm²/sec) | Capacity (cc/cc) |
|---|---|---|
| Ammonia | $349 \times 10^{-8}$ | 37.1 |
| Argon | $108 \times 10^{-8}$ | 2.89 |
| Carbon Dioxide | $632 \times 10^{-8}$ | 18.34 |
| Ethane | nil | nil |
| Ethylene | $1.7 \times 10^{-8}$ | 15.90 |
| Hydrogen Sulfide | $4.4 \times 10^{-8}$ | — |
| Methane | $0.77 \times 10^{-8}$ | 6.34 |
| Nitrogen | $105 \times 10^{-8}$ | |
| Oxygen | $2078 \times 10^{-8}$ | |
| Propane | nil | nil |
| Propylene | $0.15 \times 10^{-8}$ | 4.45 |

The selectivity of the sieve was determined for various gas mixtures to be as follows:

| Mixture | | Selectivity $(D_A/D_B)$ |
|---|---|---|
| Component A | Component B | |
| Carbon Dioxide | Methane | 821 |
| Carbon Dioxide | Argon | 5.85 |
| Carbon Dioxide | Hydrogen Sulfide | 144 |
| Nitrogen | Methane | 135 |
| Oxygen | Argon | 19.2 |
| Oxygen | Nitrogen | 19.8 |

EXAMPLE 12

Pellets prepared as in Example 3 were fed to the furnace at 50 pounds per hour. Furnace temperature was 749° C. in zone A and 838° C. in zone B. Total hot zone residence time was 10 minutes under a cocurrent purge at 1.2 feet/minute.

The sieve was tested for its diffusivity and capacity for various gases. The results were as follows:

| Gas | Diffusivity (cm²/sec) | Capacity (cc/cc) |
|---|---|---|
| Ammonia | $295 \times 10^{-8}$ | 36.2 |
| Argon | $8.6 \times 10^{-8}$ | 3.3 |
| Carbon Dioxide | $327 \times 10^{-8}$ | 19.7 |
| Ethane | nil | nil |
| Ethylene | $0.4 \times 10^{-8}$ | 16.8 |
| Methane | nil | nil |
| Nitrogen | $9.8 \times 10^{-8}$ | 3.62 |
| Oxygen | $736 \times 10^{-8}$ | 3.62 |

The carbon sieve produced had an apparent density of 0.595 g/cc. The selectivity of the sieve was determined for various gas mixtures to be as follows:

| Mixture | | Selectivity $(D_A/D_B)$ |
|---|---|---|
| Component A | Component B | |
| Oxygen | Argon | 86 |
| Oxygen | Nitrogen | 75 |
| Ammonia | Nitrogen | 30 |
| Ethylene | Ethane | >40 |
| Carbon Dioxide | Methane | >3270 |
| Carbon Dioxide | Argon | 38 |

EXAMPLE 13

Pellets prepared as in Example 3 were dried overnight to a moisture content of ~10 weight percent. These pellets were then fed to the furnace at 50 pounds per hour. Furnace temperature was 749° C. in zone A and 838° C. in zone B. Total hot zone residence time was 10 minutes under a cocurrent purge at 1.2 feet/minute.

The sieve was tested for its diffusivity and capacity for various gases. The results were as follows:

| Gas | Diffusivity (cm²/sec) | Capacity (cc/cc) |
|---|---|---|
| Oxygen | $1782 \times 10^{-8}$ | — |
| Nitrogen | $84 \times 10^{-8}$ | 3.2 |
| Argon | $50 \times 10^{-8}$ | 3.33 |

-continued

| Gas | Diffusivity (cm²/sec) | Capacity (cc/cc) |
|---|---|---|
| Carbon Dioxide | 512 × 10$^{-8}$ | 19.04 |
| Methane | 0.05 × 10$^{-8}$ | 5.55 |
| Ethylene | 0.83 × 10$^{-8}$ | 16.64 |
| Ethane | <.01 × 10$^{-8}$ | 2.04 |
| Propylene | 0.24 × 10$^{-8}$ | 7.77 |
| Propane | 0.04 × 10$^{-8}$ | 0.19 |
| n-Butane | <.01 × 10$^{-8}$ | <0.1 |
| Hydrogen Sulfide | 1.8 × 10$^{-8}$ | 28.67 |

The sieve had an apparent density of 0.584 g/cc. The selectivity of the sieve was determined for various gas mixtures to be as follows:

| Mixture | | |
|---|---|---|
| Component A | Component B | Selectivity ($D_A/D_B$) |
| Oxygen | Nitrogen | 21.2 |
| Oxygen | Argon | 35.6 |
| Carbon Dioxide | Methane | 10,240 |
| Propylene | Propane | 6.0 |
| Carbon Dioxide | Hydrogen Sulfide | 284 |

EXAMPLE 14

Six parts of decoked bituminous coal agglomerate (pulverized to 70 percent—325 mesh (U.S.S.) were mixed with 2 parts of coal tar pitch (melting point 105° C.) and 1 part wheat flour and about 2 parts water. This mixture was blended until uniformly damp. This mixture was formed into 3/16-inch diameter pellets using a pellet mill.

The pellets were fed to the furnace at 30 lbs/hour. The furnace was controlled to 743° C. The total residence time at 743° C. was 15 minutes with a cocurrent nitrogen flow of 3.7 feet/minute.

The sieve was tested for its diffusivity and capacity for various gases. The results were as follows:

| Gas | Diffusivity (cm²/sec) | Capacity (cc/cc) |
|---|---|---|
| Carbon Dioxide | 545 × 10$^{-8}$ | 13.3 |
| Nitrogen | 100 × 10$^{-8}$ | — |
| Oxygen | 907 × 10$^{-8}$ | 2.25 |
| Methane | 0.07 × 10$^{-8}$ | 3.3 |

The carbon sieve produced had an apparent density of 0.52 g/cc. The selectivity of the sieve was determined for various gas mixtures to be as follows:

| Mixture | | |
|---|---|---|
| Component A | Component B | Selectivity ($D_A/D_B$) |
| Carbon Dioxide | Methane | 7785 |
| Oxygen | Nitrogen | 9.07 |

EXAMPLE 15

The pellets prepared according to Example 14 were fed to the furnace at 30 pounds per hour. The furnace was controlled to 800° C. The total residence time at 800° C. was 15 minutes with a cocurrent nitrogen flow of 3.7 feet/minute.

The sieve was tested for its diffusivity and capacity for various gases. The results were as follows:

| Gas | Diffusivity (cm²/sec) | Capacity (cc/cc) |
|---|---|---|
| Nitrogen | 1.4 × 10$^{-8}$ | — |
| Oxygen | 265 × 10$^{-8}$ | 2.36 |

The carbon sieve produced had an apparent density of 0.53 g/cc. The selectivity of the sieve was determined for an oxygen/nitrogen gas mixture to be as follows:

| Mixture | | |
|---|---|---|
| Component A | Component B | Selectivity ($D_A/D_B$) |
| Oxygen | Nitrogen | 189 |

What is claimed is:

1. A process for separating gas mixtures containing components of at least two different molecular diameters, molecular weights or molecular shapes comprising passing the gas through a carbon molecular sieve prepared from a naturally occurring substrate and selected from the group consisting of molecular sieves having:
(a)
  (i) an oxygen diffusivity of 800×10$^{-8}$ cm²/sec or less; and
  (ii) a diffusivity ratio of oxygen to nitrogen of 15 to 100;
(b)
  (i) an oxygen diffusivity of 600×10$^{-8}$ cm²/sec or less; and
  (ii) a diffusivity ratio of oxygen to nitrogen greater than 100; and
(c)
  (i) an oxygen diffusivity greater than 800×10$^{-8}$ cm²/sec; and
  (ii) a diffusivity ratio of oxygen to nitrogen greater than 5;
here the diffusivity is measured using a starting gas pressure of one atmosphere (+/−5%) at a temperature of 25° +/−5% for 30 seconds.

2. The process of claim 1, wherein said gas mixtures are selected from the group consisting of oxygen and nitrogen, oxygen and carbon dioxide, carbon dioxide and methane, oxygen and argon, ammonia and nitrogen, ammonia and methane, carbon dioxide and ethane, ammonia and argon, nitrogen and methane, carbon dioxide and argon, carbon dioxide and hydrogen sulfide, ethylene and ethane, and propylene and propane.

3. The process of claim 2, wherein said gas mixture is oxygen and nitrogen.

4. The process of claim 2, wherein said gas ixture is oxygen and carbon dioxide.

5. The process of claim 2, wherein said gas mixture is carbon dioxide and methane.

6. The process of claim 2, wherein said gas mixture is oxygen and argon.

7. The process of claim 2, wherein said gas mixture is ammonia and nitrogen.

8. The process of claim 2, wherein said gas mixture is ammonia and methane.

9. The process of claim 2, wherein said gas mixture is carbon dioxide and ethane.

10. The process of claim 2, wherein said gas mixture is ammonia and and argon.

11. The process of claim 2, wherein said gas mixture is nitrogen and methane.

12. The process of claim 2, wherein said gas mixture is carbon dioxide and argon.

13. The process of claim 2, wherein said gas mixture is carbon dioxide and hydrogen sulfide.

14. The process of claim 2, wherein said gas mixture is ethylene and ethane.

15. The process of claim 2 wherein said gas mixture is propylene and propane.

16. The process of claim 1, wherein said carbon molecular sieve has an oxygen diffusivity of $500 \times 10^{-8}$ to $750 \times 10^{-8}$ cm$^2$/sec and a diffusivity ratio of oxygen to nitrogen of 15 to 75.

17. The process of claim 1, wherein said carbon molecular sieve has an oxygen diffusivity of $50 \times 10^{-8}$ to $500 \times 10^{-8}$ cm$^2$/sec and a diffusivity ratio of oxygen to nitrogen of 100 to 4000.

18. The process of claim 1, wherein said carbon molecular sieve has an oxygen diffusivity of $800 \times 10^{-8}$ to $3000 \times 10^{-8}$ cm$^2$/sec and a diffusivity ratio of oxygen to nitrogen of 9 to 400.

19. The process of claim 1, wherein said carbon molecular sieve has an oxygen diffusivity of greater than $800 \times 10^{-8}$ cm$^2$/sec, a diffusivity ratio of oxygen to nitrogen greater than 5 and a carbon dioxide diffusivity greater than $200 \times 10^{-8}$ cm$^2$/sec.

20. The process of claim 19, wherein said carbon molecular sieve has an oxygen diffusivity of greater than $800 \times 10^{-8}$ cm$^2$/sec, a diffusivity ratio of oxygen to nitrogen greater than 5 and a methane diffusivity greater than $0.01 \times 10^{-8}$ cm$^2$/sec.

* * * * *